United States Patent [19]

Cuvelier

[11] 4,268,736
[45] May 19, 1981

[54] INDUCTION WELDING APPARATUS FOR MANUFACTURE OF TUBING

[75] Inventor: Michel C. Cuvelier, Liege, Belgium

[73] Assignee: American Electric Fusion Co., Inc., Nashville, Tenn.

[21] Appl. No.: 896,361

[22] Filed: Apr. 13, 1978

[51] Int. Cl.³ .............................................. H05B 6/02
[52] U.S. Cl. ................................................. 219/8.5
[58] Field of Search .............. 219/8.5, 7.5, 9.5, 10.41, 219/10.43

[56] References Cited

U.S. PATENT DOCUMENTS

| | | | |
|---|---|---|---|
| 1,365,198 | 1/1921 | Sessions | 219/8.5 X |
| 1,932,423 | 10/1933 | Sessions | 219/8.5 |
| 1,967,129 | 7/1934 | Neale | 219/8.5 |
| 2,020,276 | 11/1935 | Crawford | 219/8.5 |
| 2,632,079 | 3/1953 | Body | 219/8.5 |
| 2,687,464 | 8/1954 | Crawford | 219/8.5 |
| 2,687,465 | 8/1954 | Crawford | 219/8.5 |
| 3,037,105 | 5/1962 | Kohler | 219/8.5 |
| 3,648,005 | 3/1972 | Rudd | 219/8.5 |
| 3,689,725 | 9/1972 | Hammer et al. | 219/8.5 |
| 3,701,871 | 10/1972 | Schaefer | 219/8.5 |
| 3,733,453 | 5/1973 | McLain | 219/8.5 |

FOREIGN PATENT DOCUMENTS

676923 6/1929 France .............................. 219/67

Primary Examiner—C. L. Albritton
Assistant Examiner—Keith E. George
Attorney, Agent, or Firm—Cushman, Darby & Cushman

[57] ABSTRACT

Induction welding apparatus for manufacture of tubing which includes a modifier between the induction coil and pressure rolls, an impeder inside the tube with laminations parallel to the radius of the tube which intersects the tube slit, a device for stabilizing the impeder, a device for moving the impeder in the direction of the tube axis, and special shielding means for the pressure rolls.

8 Claims, 28 Drawing Figures

INDUCTION WELDING APPARATUS FOR MANUFACTURE OF TUBING

This invention pertains to induction welding apparatus for manufacturing tubing. The apparatus according to the invention is capable of induction welding of such tubing at velocities significantly greater than heretofore obtained for certain tube materials, e.g., stainless steel. However, other materials may be welded in the apparatus to advantage over use of known equipment.

A description of the invention will proceed with reference to the preferred embodiment thereof, although the claims appearing at the end of this specification are not confined to this illustrative embodiment. Examples of the use of the exemplary embodiment also are included in this specification.

In general organization the apparatus of the invention includes means for passing the tube to be welded through a coil which is connected in an alternating electric current circuit. The eddy currents generated in the tube serve to heat the edges of the tube to a temperature whereat welding will occur when pressure rolls downstream of the coil cause the edges to come together. This general organization of components and functions is shown in several prior art U.S. patents, e.g., see Sessions U.S. Pat. No. 1,365,198 and Crawford U.S. Pat. No. 2,687,464. No attempt is made here to reference all of the other existing prior art on tube induction welding apparatus.

The illustrative embodiment of the inventions herein described (hereafter, the "apparatus") may most readily be understood from the accompanying drawings, in which.

To avoid unduly complicating the drawings they do not show details for insulating, mounting and joining components or other details which will be well within the skill of designers in the relevant art and not critical to the claimed inventions.

General Organization

Figure 1A:
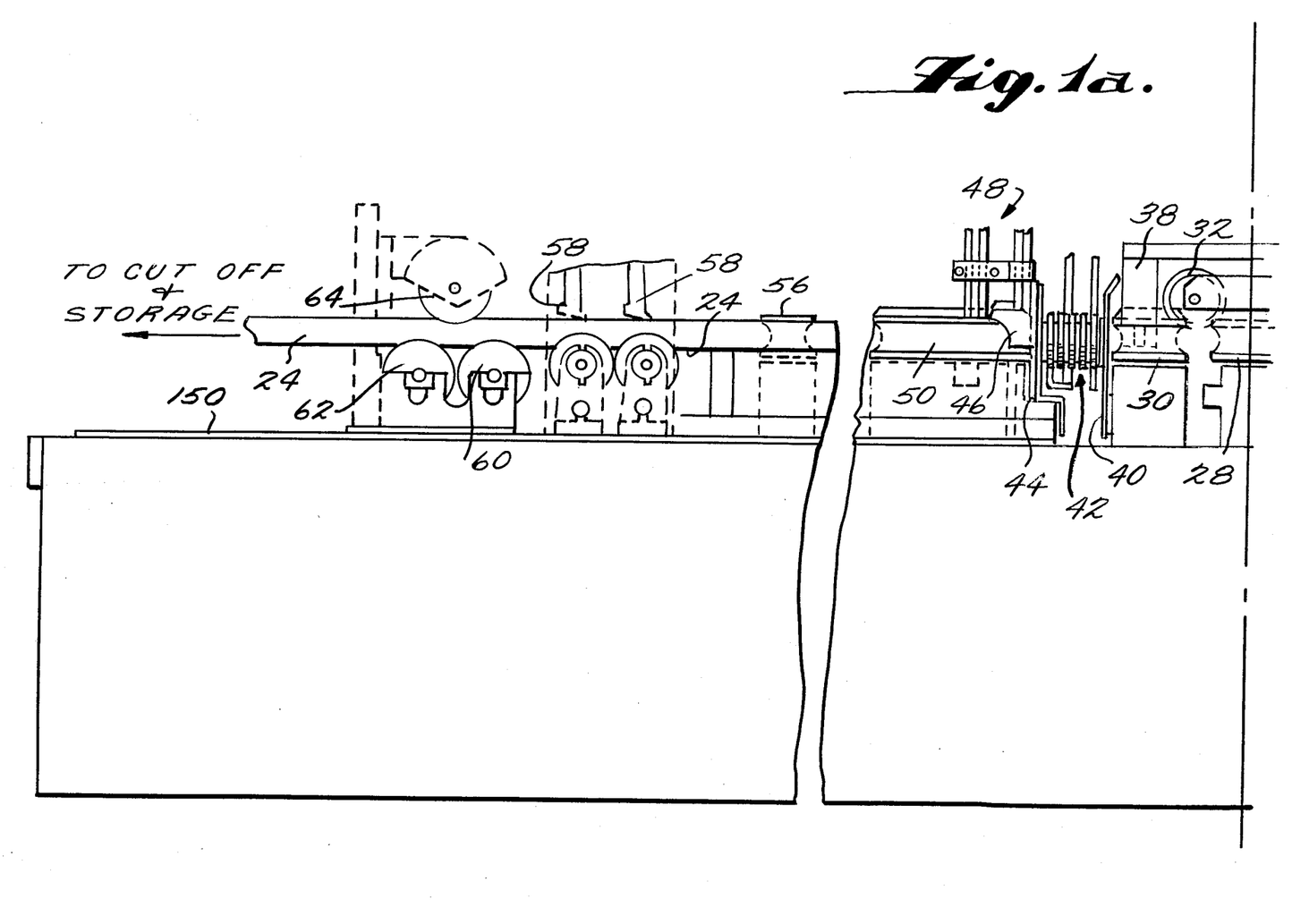
FIG. 1A is an elevation showing the overall organization of components of the apparatus.
Figures 1B, 2:
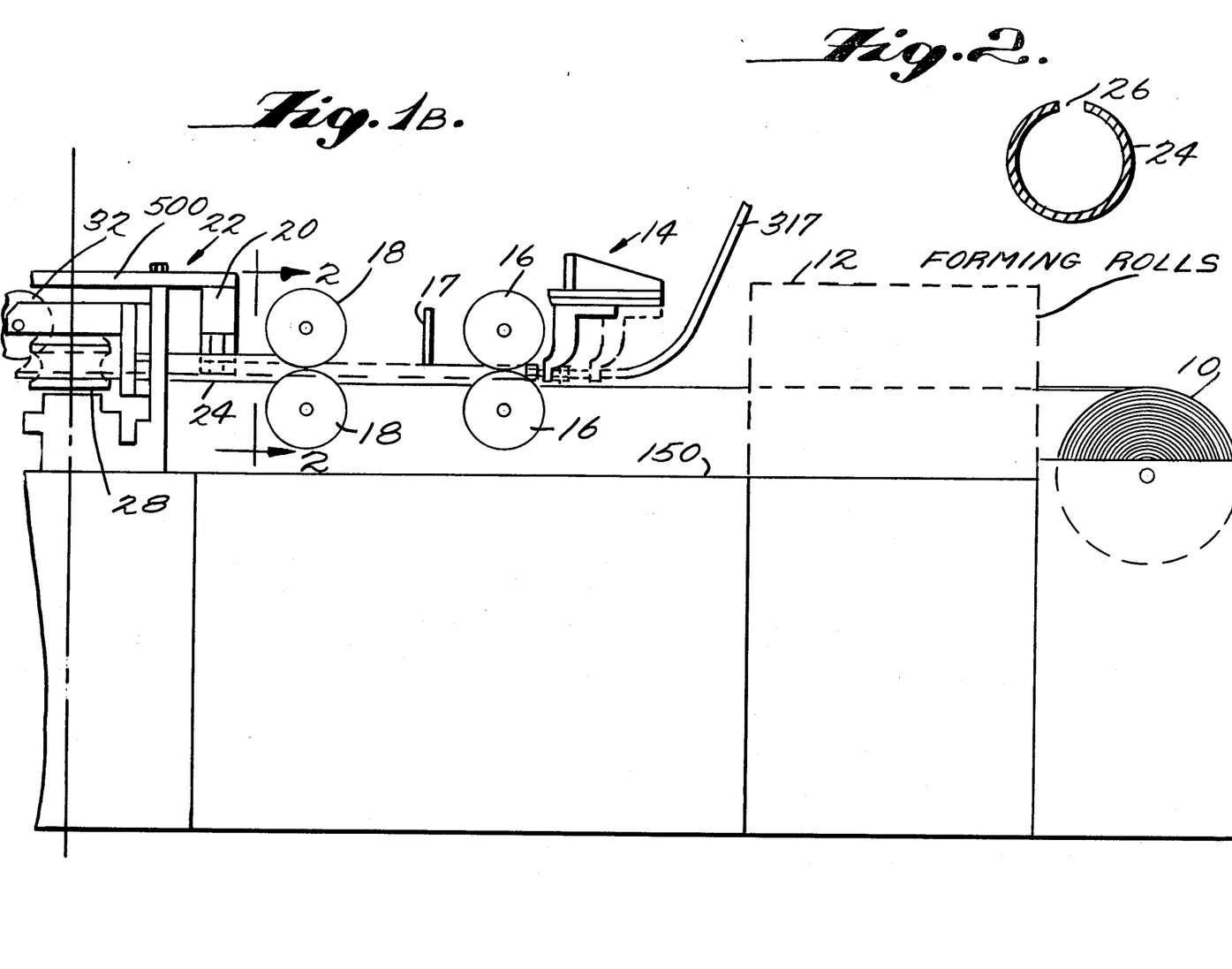
FIG. 1B, which joins with FIG. 1A, completes an elevation showing the remaining components of the apparatus.
FIG. 2 is a cross-sectional view of tubing being formed but before welding the seam.
Figure 3:
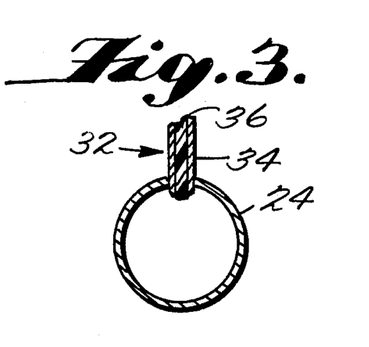
FIG. 3 is a cross-sectional view of a flanged stabilizing wheel running in the slit of the tube being positioned for welding.
Figure 4:
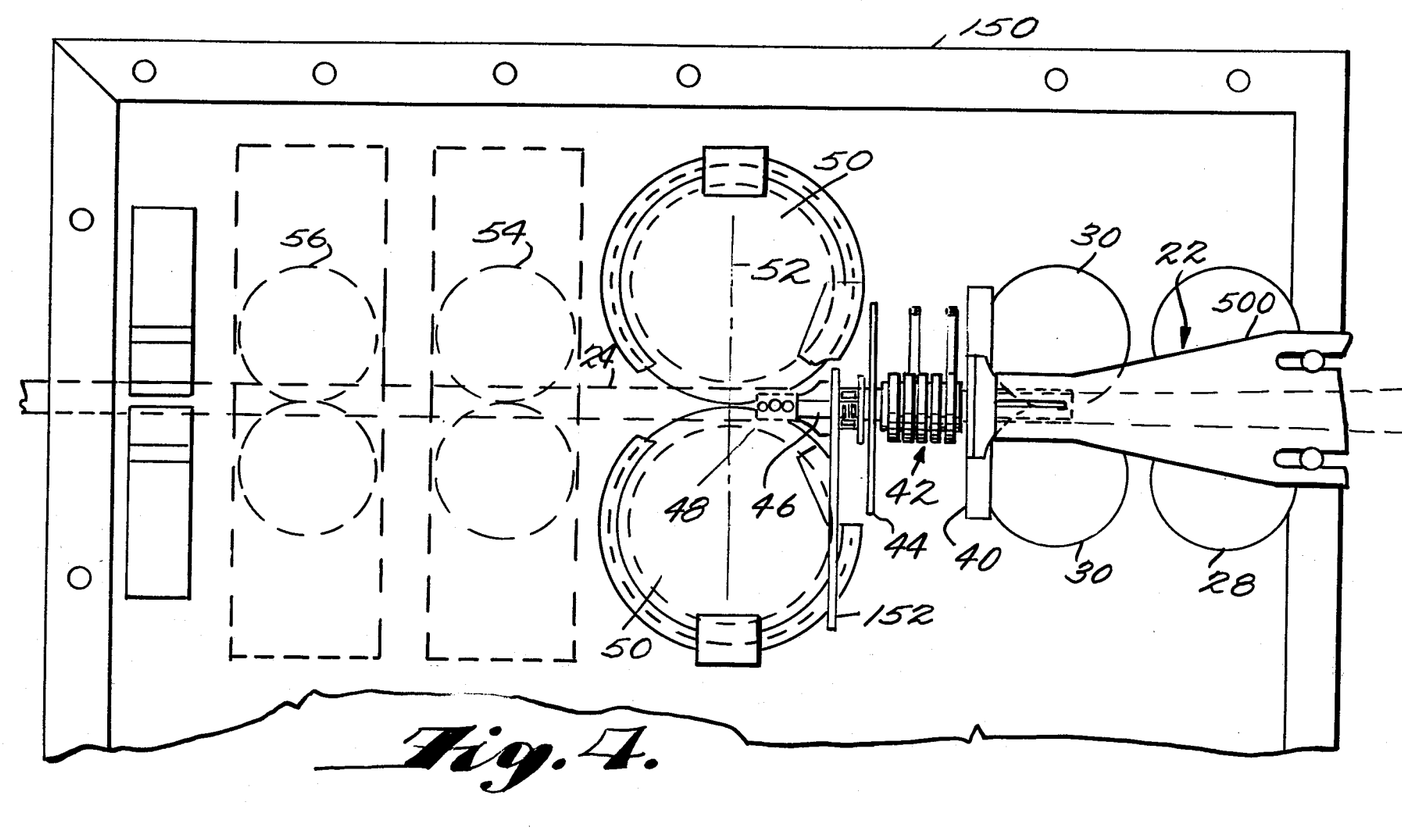
FIG. 4 is a top plan view of the apparatus in the vicinity of the induction welding portion thereof.

The general organization of the apparatus is shown in FIGS. 1A and 1B, which may be joined at the demarkation lines at the right end of FIG. 1A and the left end of FIG. 1B to provide an elongated view. At the right or "upstream" end of the apparatus a roll 10 of flat stock is provided, from which tubing will be formed. The flat stock first moves through a section of the apparatus designated 12 which contains a series of conventional forming rolls. These are not detailed because no aspect of the present invention resides therein. Next downstream is an impeder position control device 14 which is detailed later herein. Beyond the device 14 a set of forming rolls 16 is shown, followed by an impeder rotation indicator post 17, also detailed hereafter. Next downstream is a further set of forming rolls 18 beyond which the tubing stock passes the upstream fin 20 of an impeder stabilizing device 22 which is detailed later herein. At this point the tube, designated 24, is essentially in its intended circular cross-sectional form except for the usual opening or slit 26 at the top, see the cross section in FIG. 2. The tube 24 next passes two sets of forming rolls 28 and 30, between which a flanged wheel 32 is mounted to provide a means to accurately maintain the position and width of the slit 26. A view of the flange 34 of wheel 32 operating in the slit 26 is shown in FIG. 3. The wheel 32 and its flange 34 are constituted of outer faces of metal with an electrical insulating member 36 therebetween to preclude creating an electrical path between the edges of the tube 24 which define the slit 26. Just downstream of wheel 32 and between rolls 30 a downstream fin 38 of the impeder stabilizer device 22 is provided. As aforesaid, the impeder and the devices 14 and 22 associated with it will be detailed hereinbelow.

Next along the downstream movement of tube 24 is an electrically conductive shield 40 having an aperture only slightly larger than the diameter of tube 24. Adjacent the downstream side of shield 40 is an induction coil 42 which will be detailed with reference to FIGS. 4-8. The purpose of the induction coil is to generate electrical eddy currents in the tube 24 which will heat the edges of the tube to welding temperature.

A further shield 44 of electrically conductive material is positioned at the downstream end of coil 42, and this shield is immediately followed by a device which will be referred to in this specification as a modifier 46, the latter being detailed hereafter with reference to FIGS. 4, 5 and 9-14. Included with the modifier 46 is a system 48 of tubes for supplying inert gas to tube 24 between the coil and a set of pressure rolls 50. A coolant also is provided to the modifier at this point. Rolls 50 serve as means to force together the edges of tube 24 which to this point have defined the slit 26. The edges meet essentially at a contact point defined by the intersection of the longitudinal axis of the tube 24 and a line joining the centers of the axes of rolls 50. The latter line is designated 52 in FIG. 4 and is hereinafter referred to as the pressure rolls centerline. Its location is also marked 52 at the extreme left end of FIG. 5.

Downstream of the pressure rolls 50 the apparatus becomes conventional and no detailed description need be given. Briefly, rolls 54 (shown in FIG. 4) and 56 are provided to impart stability to the tube 24, followed by scarfing tools 58 to remove the weld bead which may form on the exterior of the tube. Then follow further rolls 60, 62 and 64, which are part of the system to feed the finished tube 24 into cut-off and storage devices which are not shown.

From the preceding general description those familiar with the past manufacture of tubing by induction welding will recognize that the purpose of the apparatus is to cause heating by an induction coil just upstream of pressure rolls which bring the edges of the tube into contact. However, by virtue of certain novel features of the present apparatus it is possible to weld tubing from certain materials, e.g., stainless steel, at velocities never heretofore obtained to applicant's knowledge.

The Modifier

Figures 9, 10, 11:
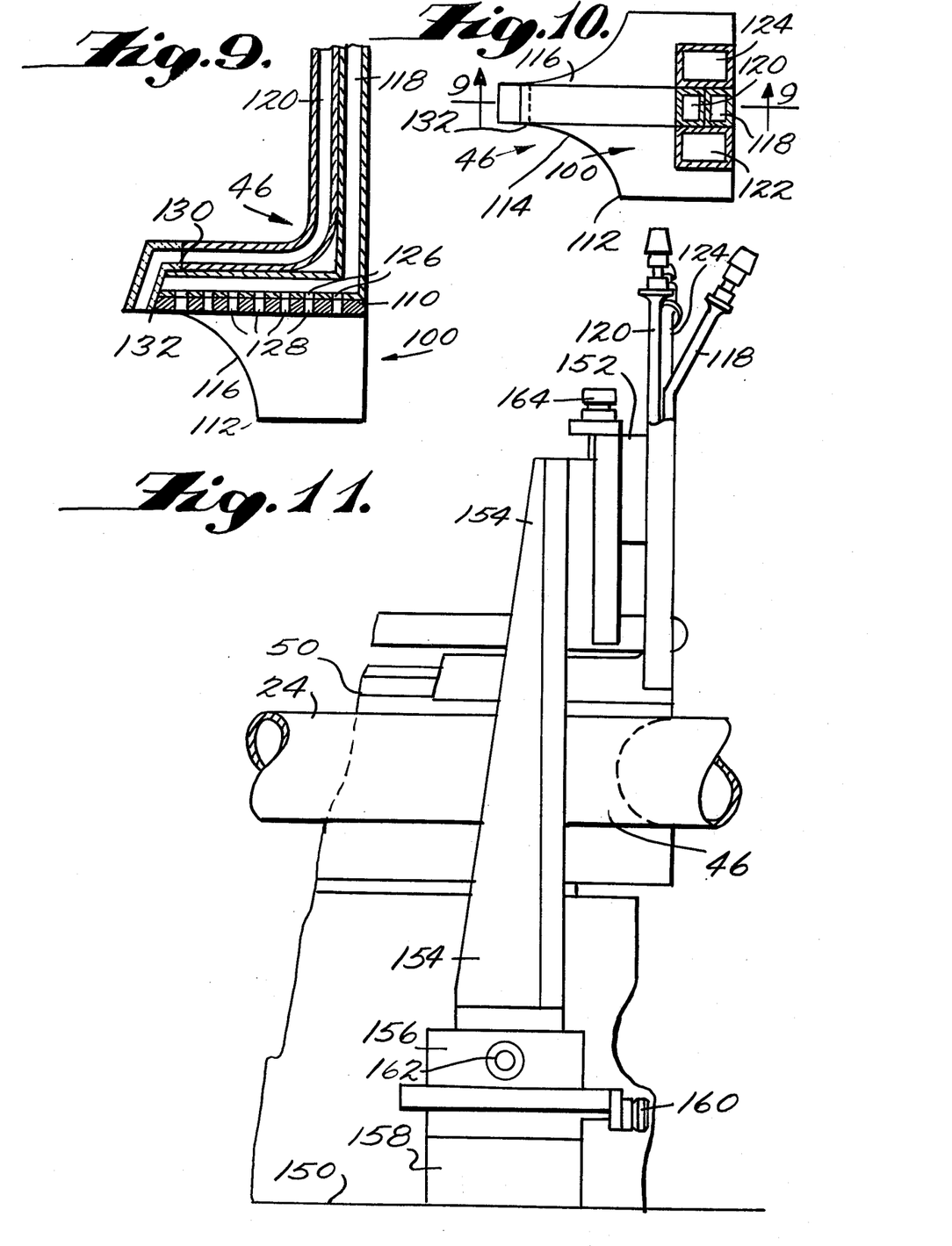
FIG. 9 is a cross section in elevation of a modifier employed in the apparatus, taken on 9—9 of FIG. 10.
FIG. 10 is a top plan view of the modifier employed in the apparatus.
FIG. 11 is a side elevational view of a three-dimensional mounting means for the modifier.

One component of the apparatus, of particular importance in the manufacture of certain tubes, e.g., those of stainless steel, is the modifier 46, shown in FIGS. 1A, 4, 5 and 9-14. This is a device constructed of an electrically conductive but non-magnetic material, preferably copper. The modifier overlies the tube 24 above the slit 26 between the induction coil 42 and the pressure rolls centerline 52. The shape of the modifier 46 is best observed in FIGS. 9, 10 and 12. It consists of an arcuate body portion 100 extending from either side of a top central region 110 which is located above and overlies the slit 26 in tube 24. The longitudinal axis of the modifier will be capable of coincidence with the longitudinal axis of the tube 24. The upstream end of the modifier (the right hand end in FIGS. 9 and 10) is formed at 90 degrees to the longitudinal axis thereof, and provides the full arcuate extent of the modifier, i.e., approximately 240 degrees, as apparent in FIG. 12. This full arcuate extent is carried downstream to point 112, beyond which, downstream, the arcuate extent lessens according to the configuration of edges 114 and 116 as shown in FIGS. 9 and 10. The result, in plan view (FIGS. 4 and 10), permits the projection of the modifier close to the intake region of the pressure rolls 50. Thus the modifier is a structure having a portion extending between the induction coil 46 and the pressure rolls 50 and overlying the slit 26 in the tube 24. The modifier also is characterized by portions which may be called skirts extending laterally from the portion overlying the slit, these skirt portions being shaped in accordance with the aforesaid views of the drawings to conform to the curvature of the rolls 50.

The modifier 46 is supported by a cluster of four tubes 118, 120, 122 and 124 which extend upwardly from the modifier body portion. Tube 118 has a horizontal portion which is fixed to the top 110 of the modifier along its length and has a series of openings 126 which communicate with corresponding openings 128 along the top 110 of the modifier, whereby an inert gas, e.g., argon, may be introduced through tube 118 to flood the region under the modifier and exclude the oxygen of the air from the weld zone. Supplemental argon also may be introduced through tube 120 which terminates in an electrically insulative tip 130 at the downstream limit of the modifier. The downstream limit of the electrically conductive modifier is located at 132. The tubes 122 and 124 are for introducing a coolant to flow down over the sides of the modifier and keep it reasonably cool. Tubes 118, 120, 122 and 124 most conveniently are made of copper to facilitate their being soldered together and to the modifier to make a rugged unit.

Figure 12:
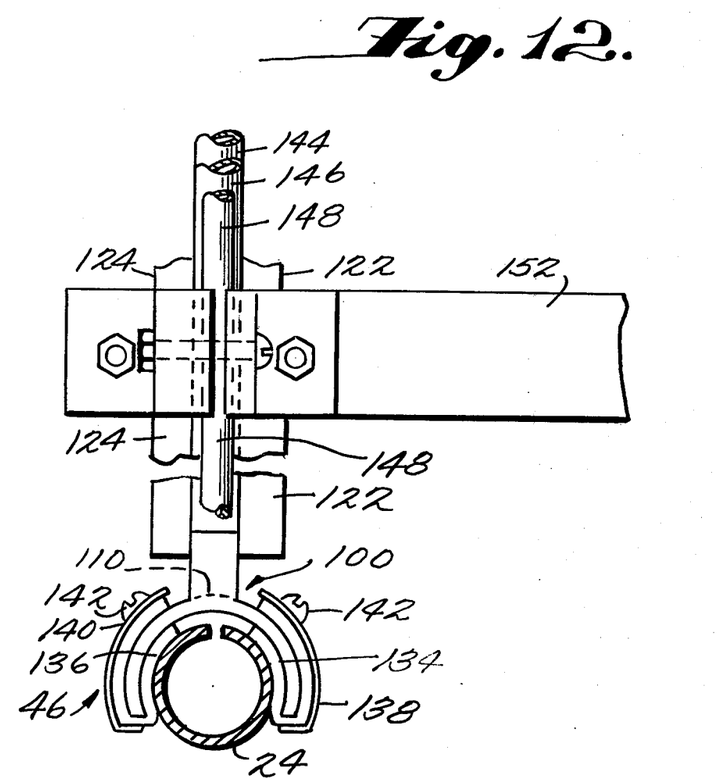
FIG. 12 is a front elevational view of the modifier and associated components.

A further feature of the modifier is a pair of liners 134 and 136 visible in FIG. 12. These are coextensive with the body of the modifier, and are held in place by clamp members 138 and 140 supported on the modifier by screws 142. The inner skirts of the liners 134 and 136 are pre-formed to have a tendency to a position inwardly of the position that the tube 24 occupies when present. Therefore, while tubing 24 is in place the liners will bear upon the outer surface of the tube, as shown in FIG. 12, and confine the argon from tubes 118 and 120 to movement along and through the slit 26.

Figure 13:
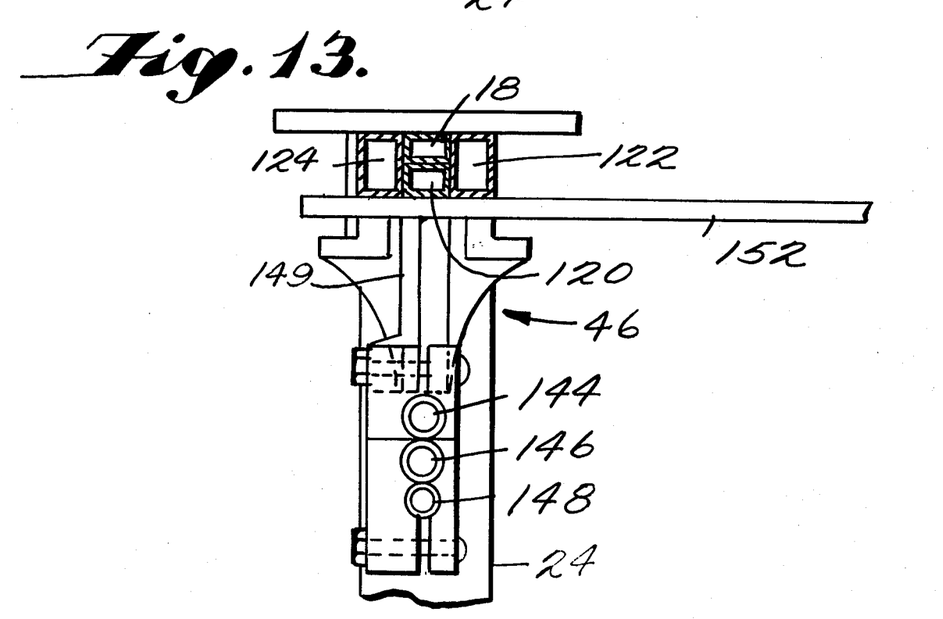
FIG. 13 is a top plan view of the modifier and associated components.
Figure 14:
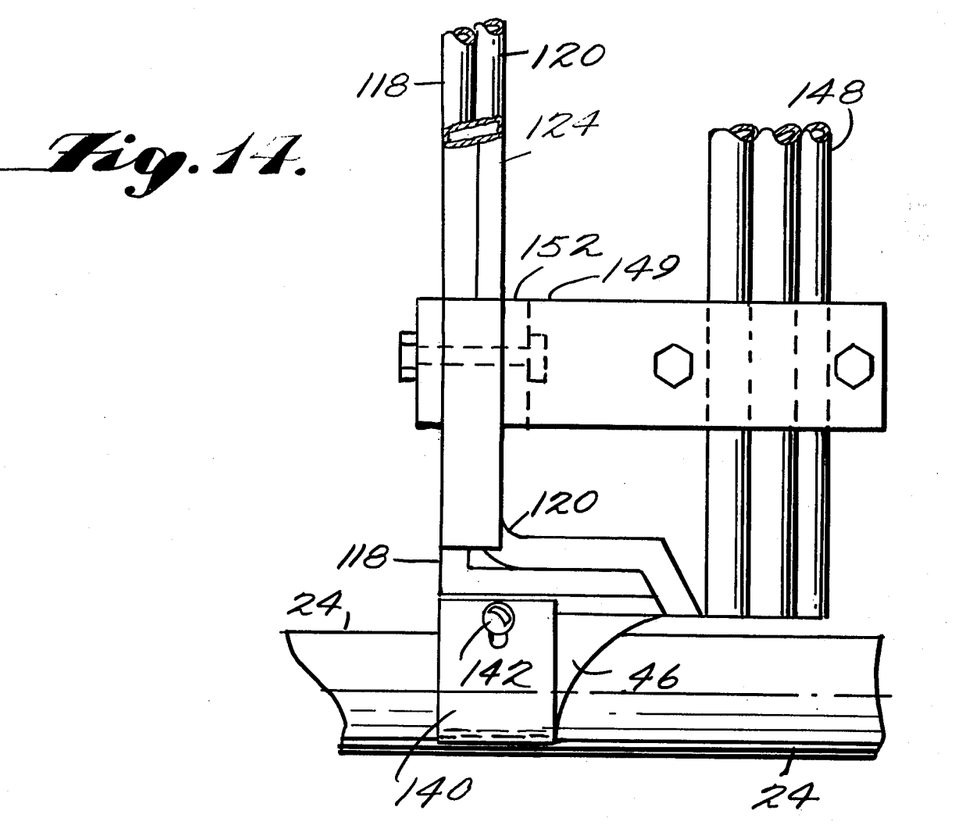
FIG. 14 is an elevational view of the modifier and associated components.
Figure 15:
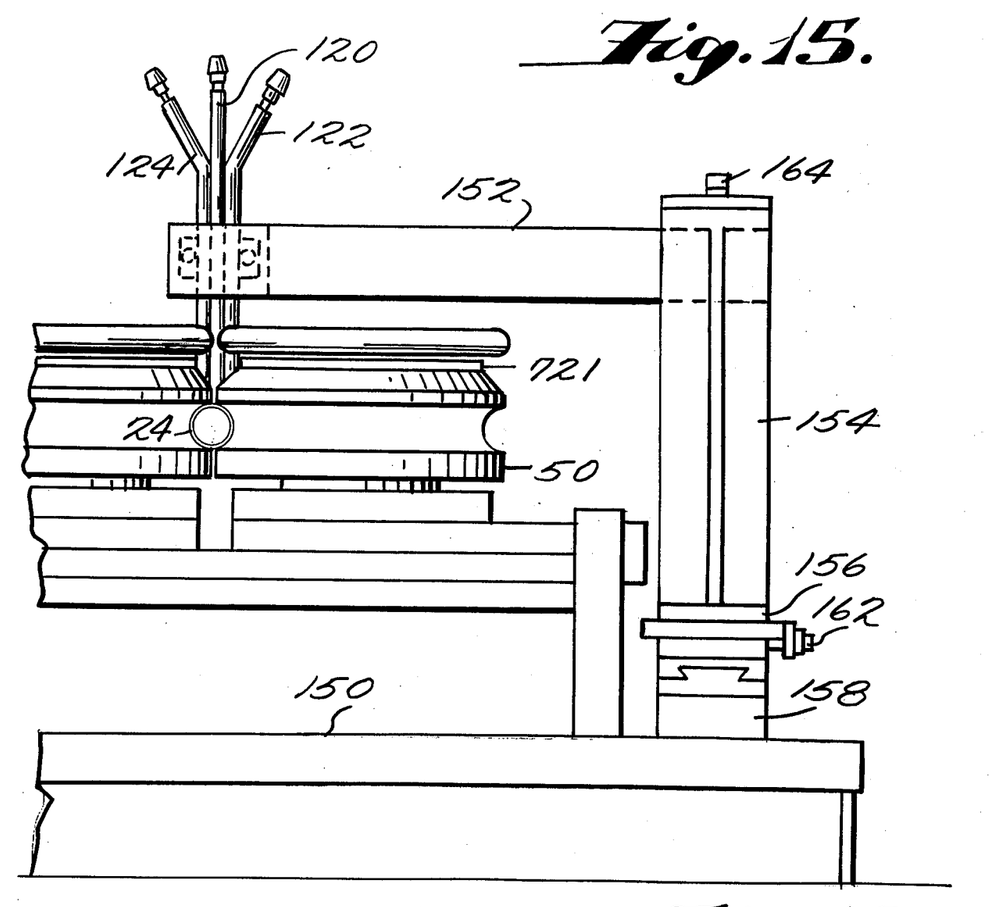
FIG. 15 is a front elevational view of the mounting means for the modifier.
Figure 16:
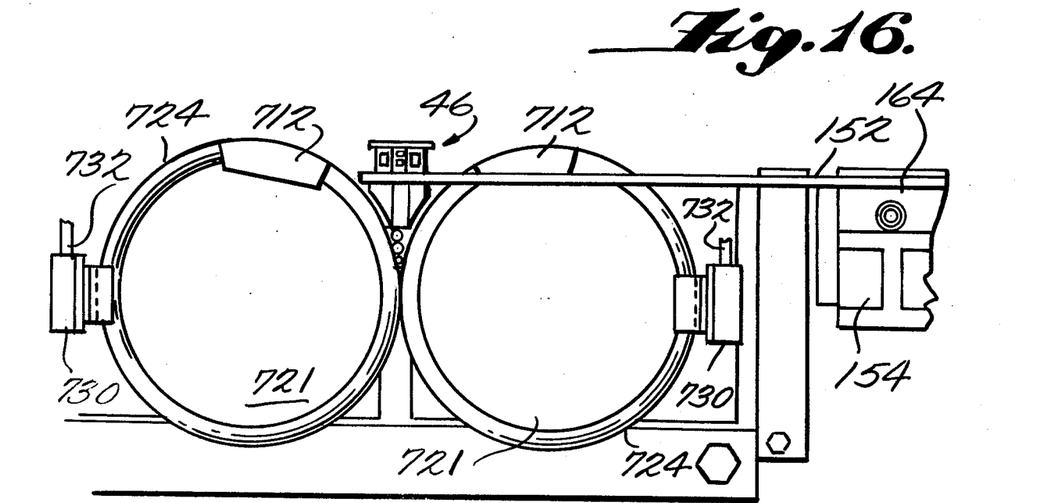
FIG. 16 is a top plan view of the mounting means for the modifier.

An additional supply of argon is provided by tubes 144, 146 and 148 which are located just upstream of the nip of the pressure rolls 50 to complete the exclusion of air (oxygen) from the weld region. Tubes 144, 146 and 148 may be supported from the cluster of tubes 118, 120, 122 and 124 by a bracket 149 (FIG. 13).

The modifier assembly is mounted from the frame 150 of the apparatus to provide very fine adjustment in x, y and z directions. This mounting is accomplished by fixing the cluster of tubes 120-124 to a bar 152 (FIGS. 5, 11, 15 and 16) which in turn is mounted on an upright member 154. The upright 154 is in turn mounted on a bed 156 which in turn is mounted on a bed 158 which is fixed to the frame 150. Movement between bed 158 and bed 156 is by a conventional splined assembly under control of screw device 160 (FIG. 11), permitting fine adjustment in the x direction (parallel to the axis of tube 24). Movement between bed 156 and upright 154 (in the y or transverse direction) is by a similar splined assembly under control of screw device 162. Movement between upright 154 and bar 152 (in the z or vertical direction) is by a similar splined assembly under control of a screw device 164. The splined assemblies referred to are of the type commonly used in mounting tools in lathes and other machine tools.

The Induction Coil

Figure 5:
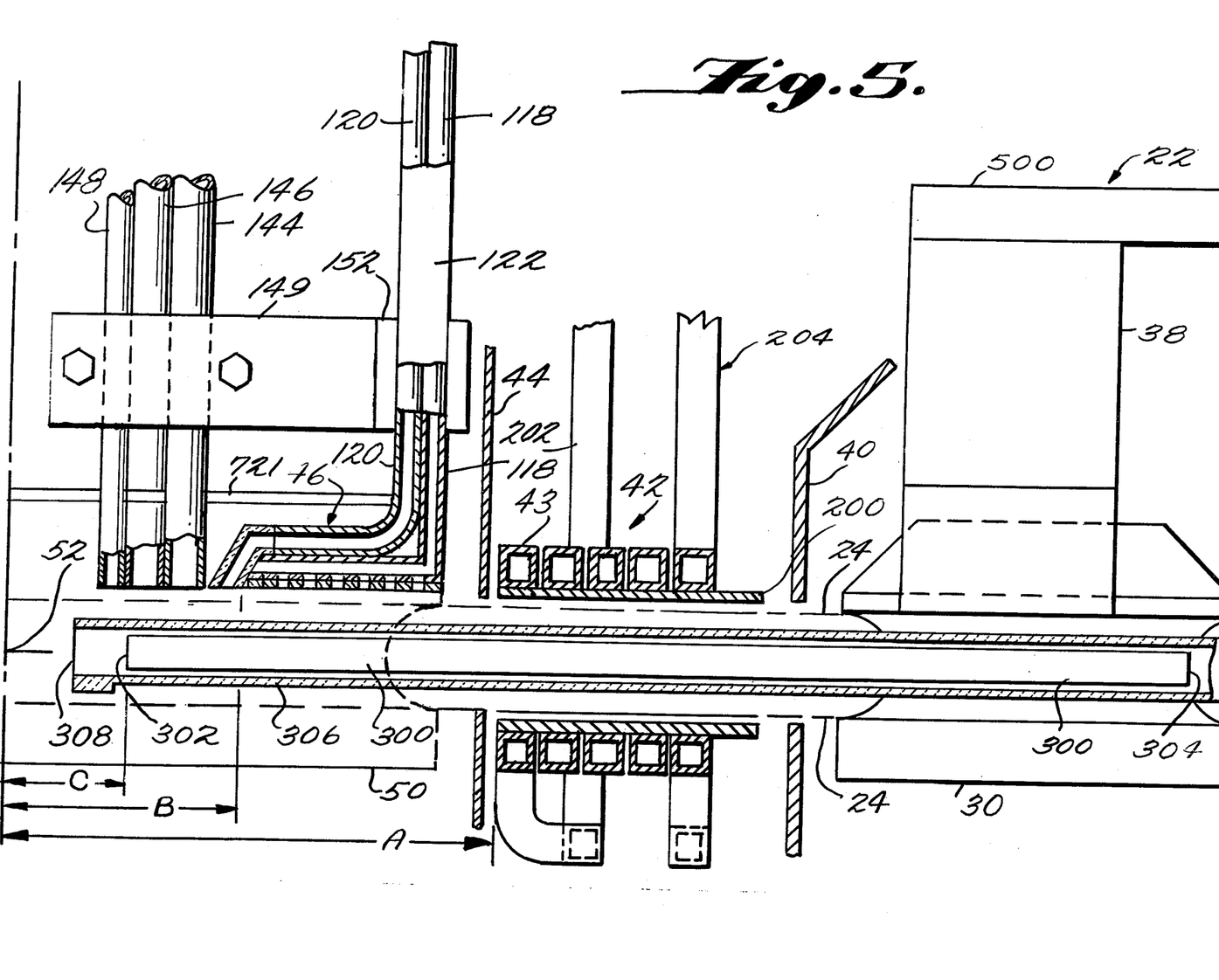
FIG. 5 is a cross section in elevation of the apparatus in the vicinity of the welding portion thereof.
Figures 6, 7, 8A:
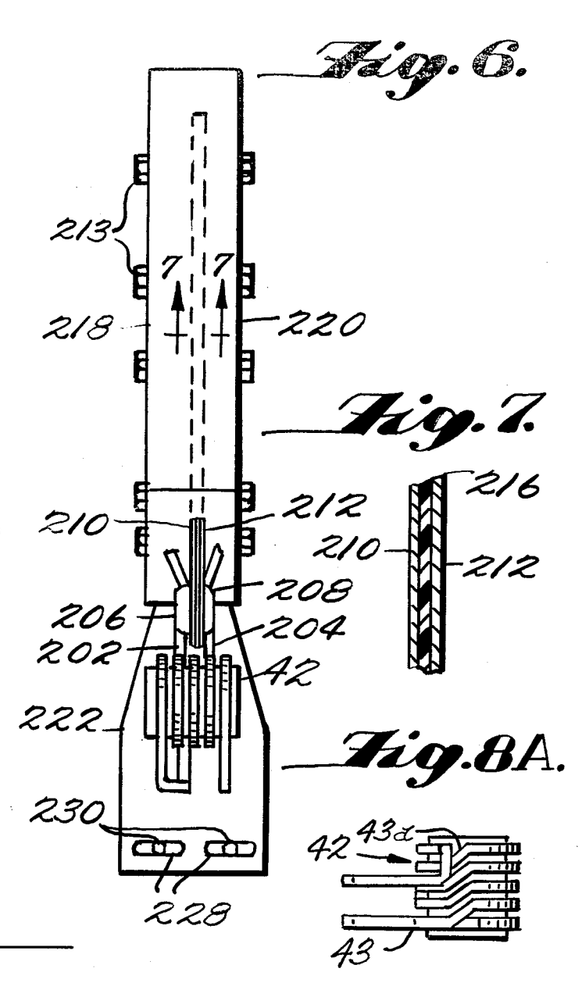
FIG. 6 is a front elevational view of a system for conducting electric current to the induction coil of the apparatus.
FIG. 7 is a cross-sectional view taken at 7—7 of FIG. 6.
FIG. 8A is a bottom view of the induction coil also shown in FIGS. 1A, 4, 5 and 6.

The induction coil 42 is five turns of tubing 43 which is arranged to carry water internally as a coolant. The turns are in planes perpendicular to the axis of the tube being welded, with the turns connected by displacement sections 43a. The latter are shown in FIG. 8A. The preferred dimensions of the coil are substantially to scale relative to the tube 24 as shown in FIG. 5. The turns of the coil 42 are wound about an electrically insulating liner 200, preferably of Teflon, leaving a small clearance between the inner diameter of the liner and the outer diameter of the tube 24. The turns of coil 42 are spaced apart as shown, to avoid short circuiting between them. Insulating spacers also may be employed for this purpose. The coil tubing may be round or of other cross section.

Coil 42 is to be held rigidly at its desired location relative to the axis of tube 24 and the pressure rolls centerline 52. Such support is accomplished by the structure shown in FIGS. 6-8. The leads 202 and 204 from the coil 42 are fixed by electrically conductive washers 206 and 208 to electrically conductive plates 210 and 212, which extend into the electrical cabinet 214. Plates 210 and 212 are separated by an insulating layer 216, e.g., Teflon (FIG. 7). By this arrangement the electrical energy may readily be delivered to the coil in the large quantity required. Coil leads 202 and 204 extend beyond the washers 206 and 208 for connection to hoses (not shown) for carrying water as a coolant. To provide lateral stability to the coil, and protect persons attending the apparatus, sheets 218 and 220 of electrically insulating material, e.g., Plexiglas, are mounted in spaced relation to the plates 210 and 212 by suitable bolts 213 and spacing sleeves insulated from the plates. To provide further rigidity to the coil 42 a stabilizer bar 222 is provided between the nose end of the coil support structure and the frame 150 of the apparatus.

Figure 8:
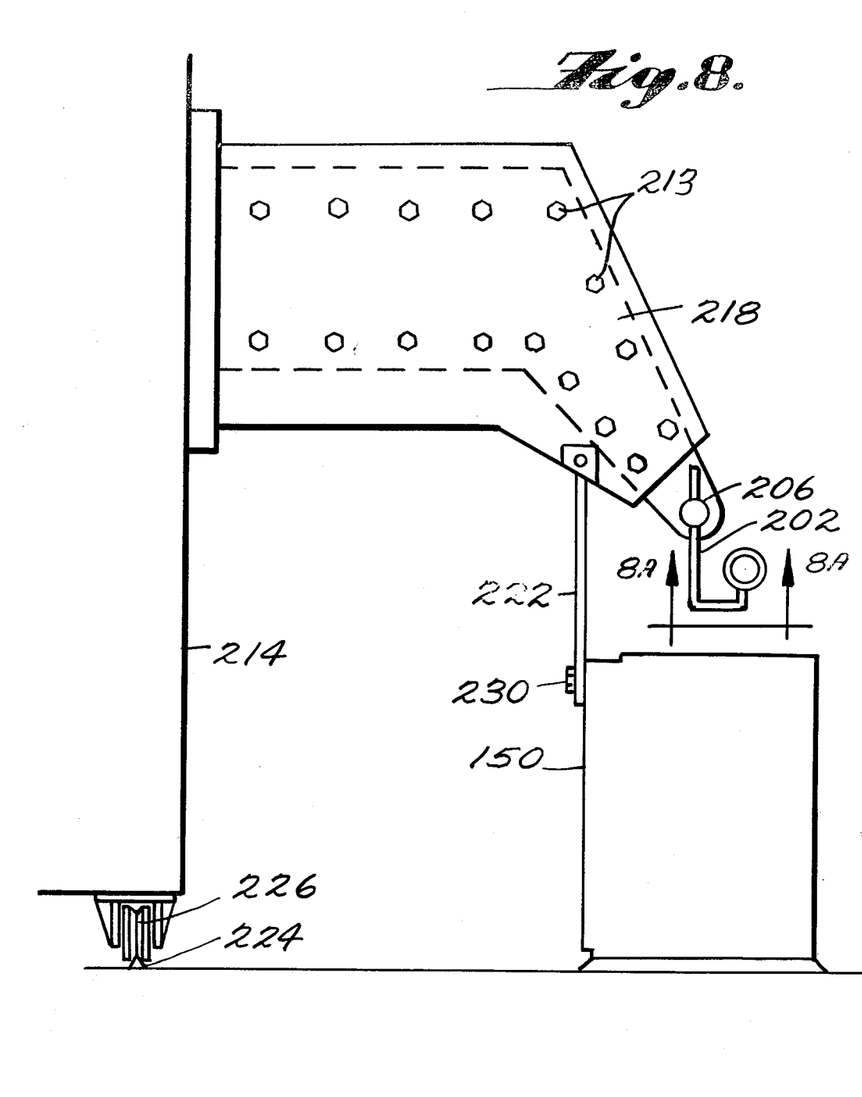
FIG. 8 is a side elevational view of the structure of FIG. 6 and associated components.

To facilitate adjustment of the position of coil 42 relative to the longitudinal axis of the tube 24 the electrical cabinet 214 will be mounted on rails 224 by wheels 226, one of each being shown at the lower left corner of FIG. 8. Stabilizer bar 222 will be provided with slots 228 (FIG. 6) for receiving mounting bolts 230. The latter will be tightened after an adjustment of position along rails 224.

The Impeder

Figure 17:
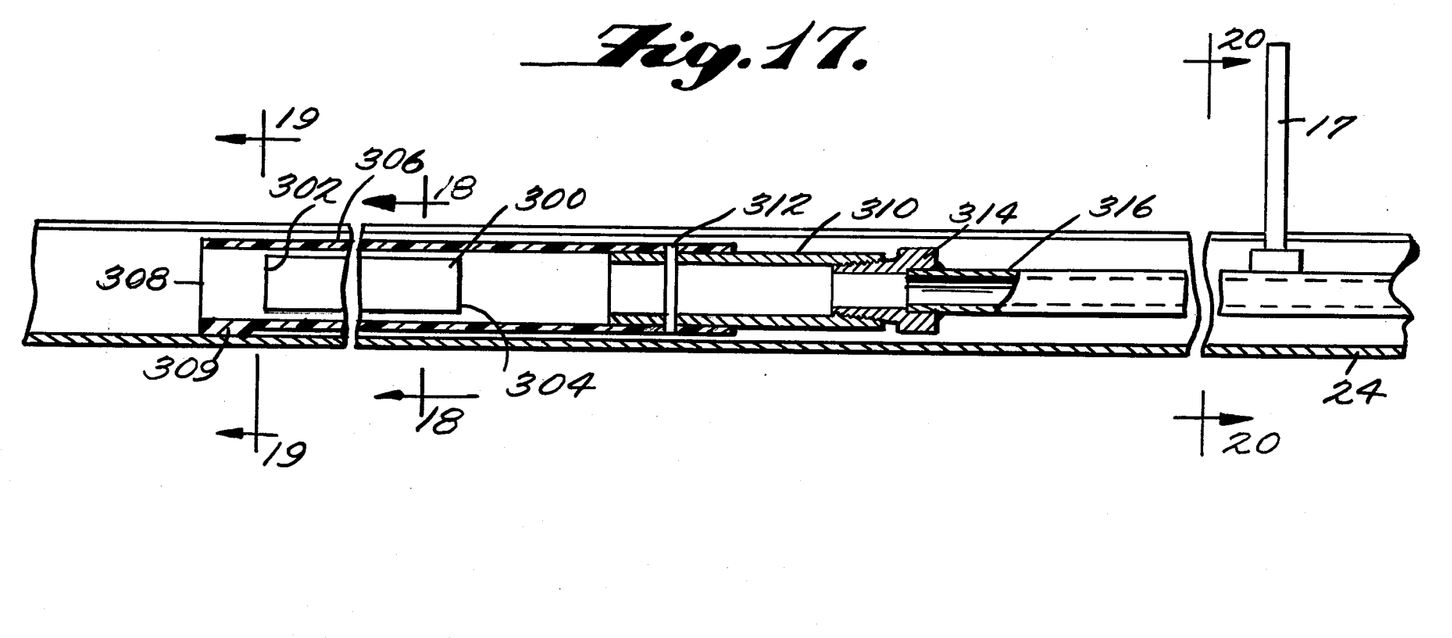
FIG. 17 is a cross section in elevation of an impeder employed in the apparatus.
Figure 18:
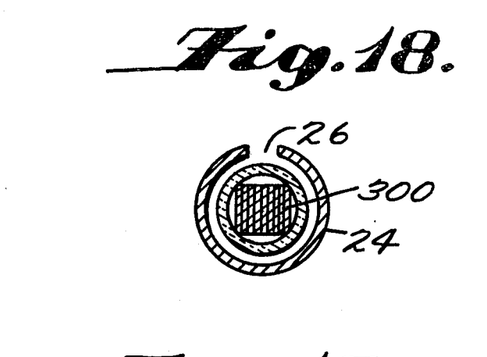
FIG. 18 is a cross-sectional view taken at 18—18 of FIG. 17.

Referring particularly to FIGS. 5, and 17-20 a detailed description will now be given of the device hereinabove referred to as the impeder, which is positioned inside the tube 24. The impeder comprises a core which is an elongated stack 300 of laminations of magnetic material such as that used in electrical transformer coils. The planes of the laminations are to be vertical, as shown in FIG. 18, i.e., parallel to the radius of tube 24 bisecting slit 26. The downstream end 302 of the impeder core 300 will be located a given distance upstream of the pressure rolls centerline 52, as discussed later herein. The upstream end 304 of the impeder core 300 will be upstream of the upstream end of induction coil 42 by at least a length of coil 42.

Figure 19:
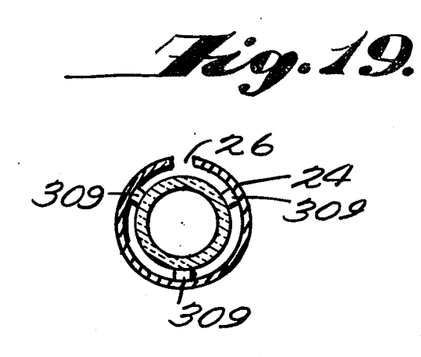
FIG. 19 is a cross-sectional view taken at 19—19 of FIG. 17.
Figure 20:
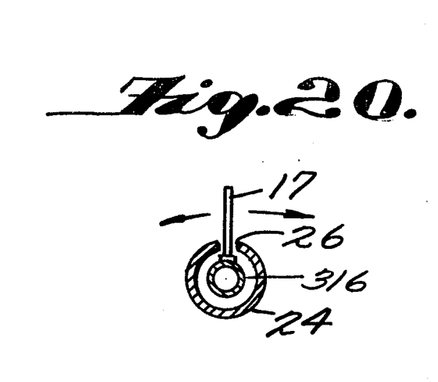
FIG. 20 is a cross-sectional view taken at 20—20 of FIG. 17.

Impeder core 300 will be press or friction fitted into a tube 306 of electrically insulating material, e.g., Teflon. At the downstream end 308 of tube 306 a spider arrangement as shown in FIG. 19 with legs 309 will maintain tube 306 and therefore impeder core 300 centered in tube 24. Coolant will be flowed through tube 24 during the welding process, and will move in part between the inner wall of tube 24 and the outside of tube 306, and in part between the inner wall of tube 306 and the impeder core 300.

Upstream of end 304 of the impeder core the tube 306 is joined to a further tube 310, which may be electrically conductive. The joint between tubes 306 and 310 should insure against relative rotation, which may be effected by a pin 312 as illustrated in FIG. 17. Further upstream a bushing 314 may be employed to connect tube 310 to a further tube 316 which extends to the impeder control device 14 shown in FIG. 1B. However, at some point upstream of the impeder core and as close thereto as possible, an impeder rotation indicator post 17 is mounted on tube 316. The purpose of post 17 is to indicate whether the magnetic forces or other forces on impeder core 300 may have caused it to rotate out of its desired position. The post 17 will be more narrow than slit 26, to permit movement of the post at least 10 degrees. A cross section showing post 17 in place is presented in FIG. 20. Inasmuch as the tube 316 is held against rotation at its upstream end and the post 17 is between the impeder core 300 and the fixed upstream end, the rotation shown by post 17 will be some fraction of the impeder rotation determined by the torsion characteristics of the core 300 and the tubes 306, 310 and 316.

The Impeder Control Device

The impeder control device 14 (FIG. 1B) will next be explained. The purpose of this device is twofold, first, to accurately position the downstream end 302 of the impeder core relative to the pressure rolls centerline 52, and, second, to retract the impeder a considerable distance upstream of line 52 during start-up of the apparatus. If the latter is not done overheating of tube 24 in the vicinity of the coil 42 and modifier 46 will be experienced.

Figure 21:
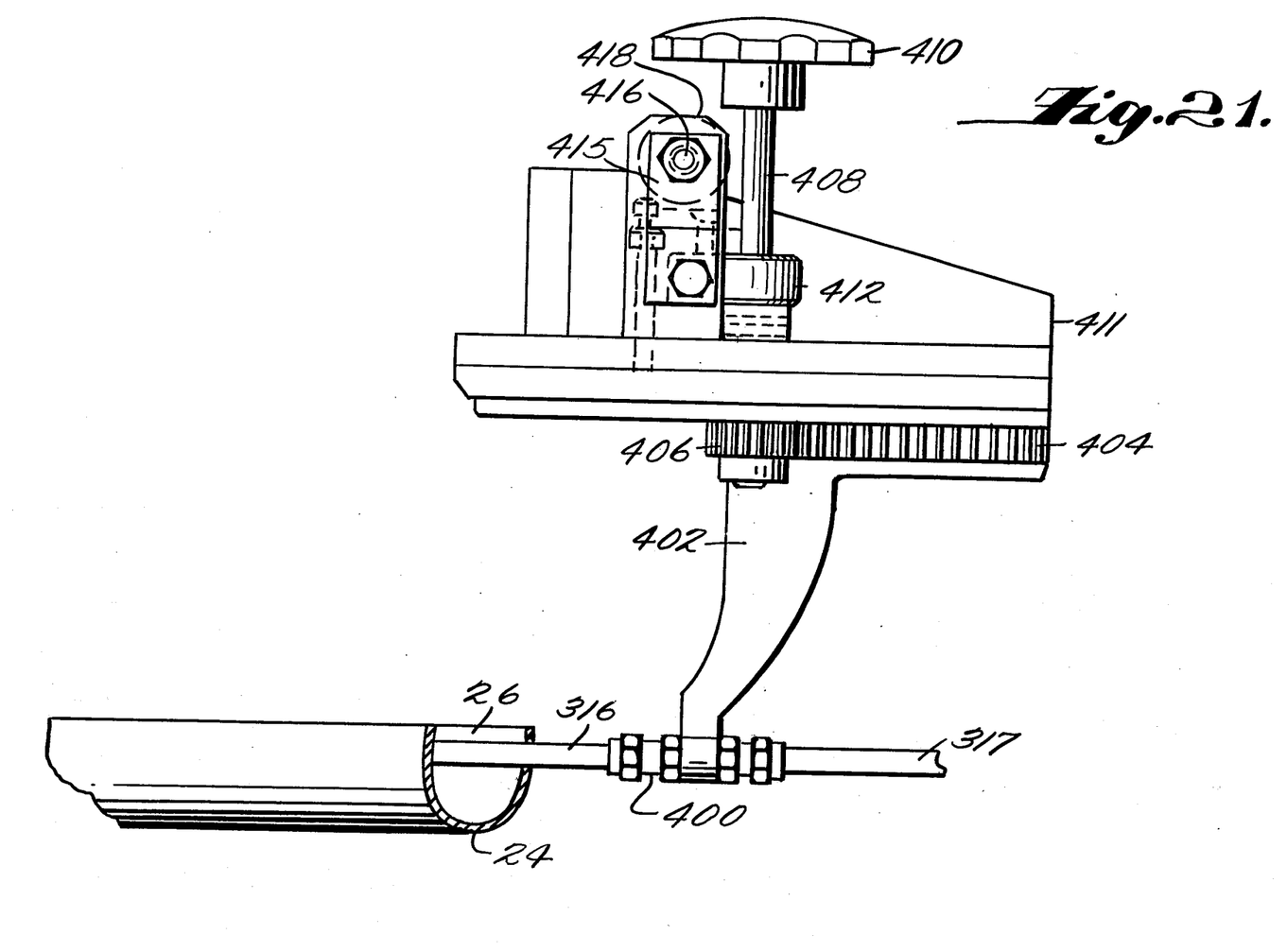
FIG. 21 is a side elevational view of an impeder control device employed in the apparatus.
Figure 22:
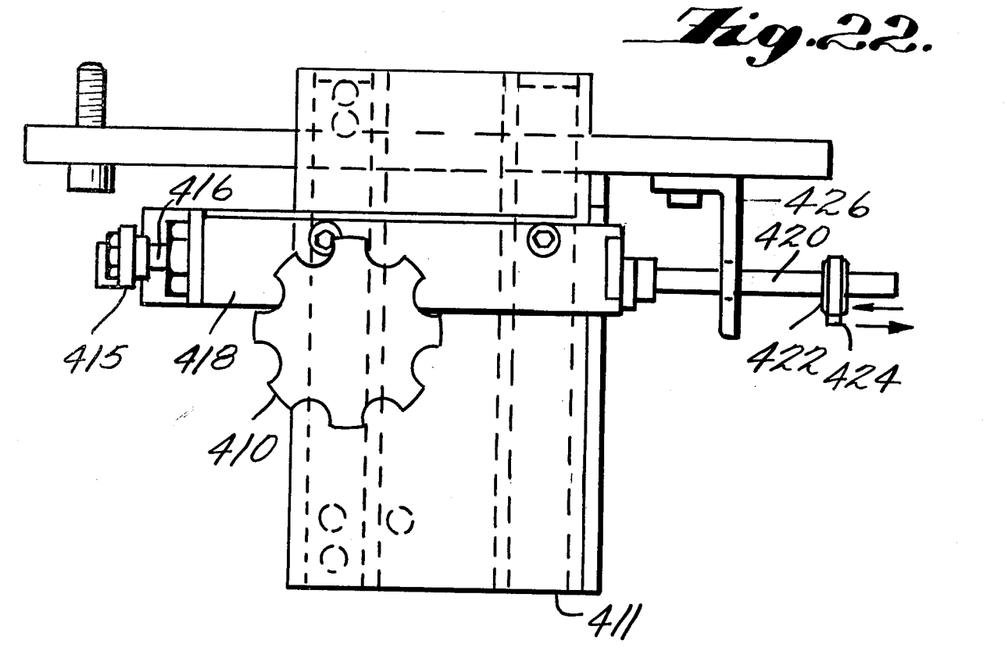
FIG. 22 is a top plan view of an impeder control device employed in the apparatus.
Figure 23:
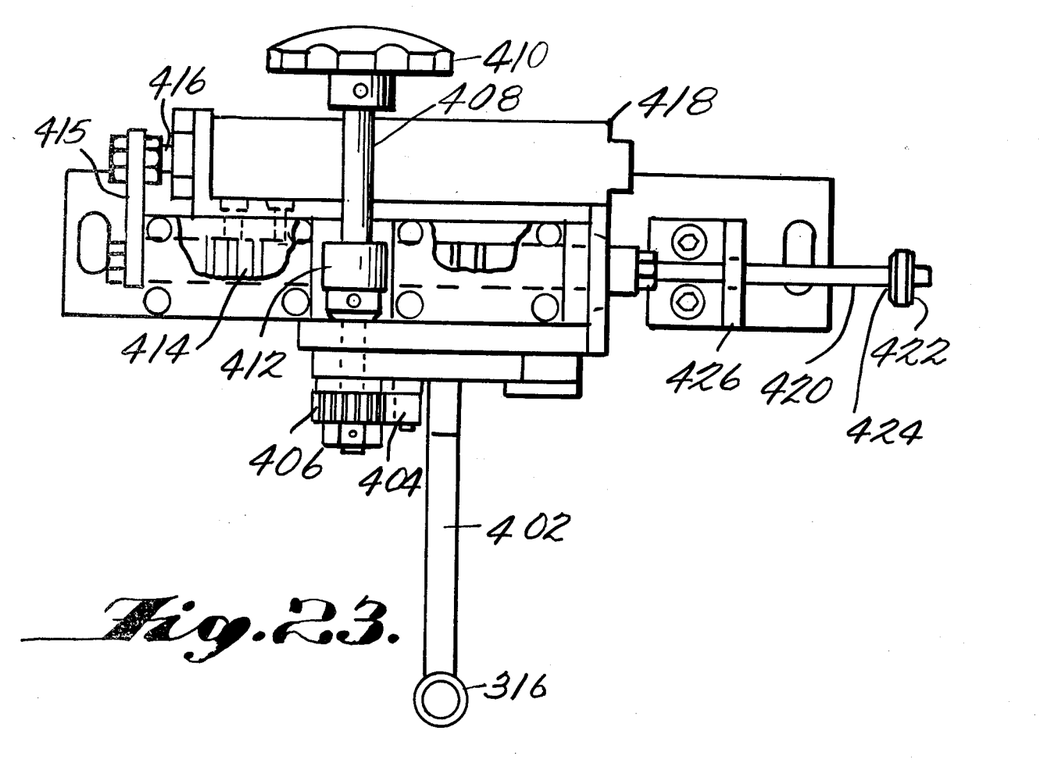
FIG. 23 is an end elevational view of an impeder control device employed in the apparatus.

Referring to FIGS. 21, 22 and 23 the tube 316 is fixed by suitable bushings 400 to a support arm 402. Tube 316 continues, as tube 317, to a source of coolant to be flowed through the impeder. Arm 402 at its upper end is attached to a rack gear 404 engaged by a pinion gear 406. Gear 406 is fixed to shaft 408 of a hand wheel 410. The supporting structure 411 upon which the aforementioned components are mounted will be rigidly mounted to the frame 150 of the apparatus by any convenient means (not shown). Another pinion gear 412 is fixed to shaft 408, and gear 412 engages a rack gear 414 which is fixed by arm 415 to the piston rod 416 of a pneumatic or hydraulic cylinder 418, the latter being fixed to the supporting structure 411. A threaded rod 420 extends from rack 414 and is provided with a stop nut 422 which may be locked in place by a set screw 424. The rod 420 passes freely through an aperture in a bracket 426 fixed to the supporting structure 411.

Activation of the cylinder 418 by suitable valving (not shown) in a first direction will move rack 414 to the right as viewed in FIGS. 22 and 23 and will retract the impeder to an upstream position (to the right in FIG. 21). Activation of the cylinder 418 in the opposite direction will move rack 414 to the left in FIGS. 22 and 23 until the stop nut 422 engages bracket 426, thereby limiting the downstream movement of the impeder at a desired position relative to the pressure rolls centerline 52. The hand wheel 410 may be used in adjusting the impeder position prior to setting the stop nut.

The Impeder Stabilizing Device

Figure 24:
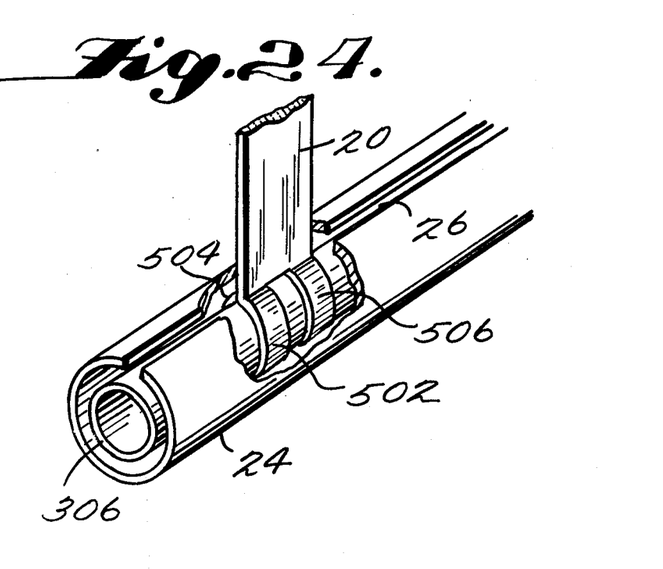
FIG. 24 is an isometric detail of an impeder stabilizing device employed in the apparatus.
Figure 25:
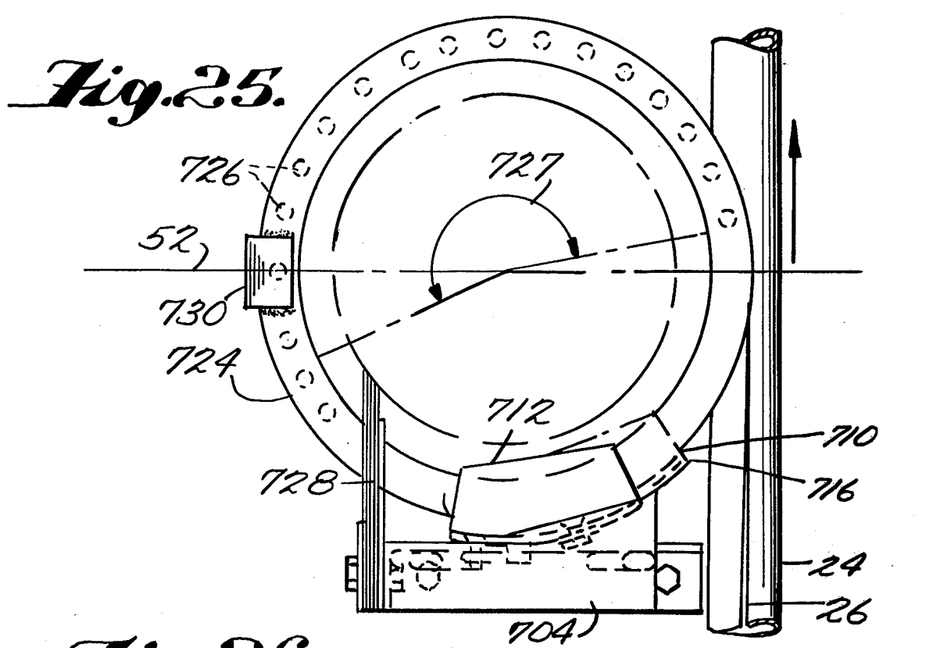
FIG. 25 is a top plan view of a system for shielding and cooling pressure rolls employed in the apparatus.
Figure 26:
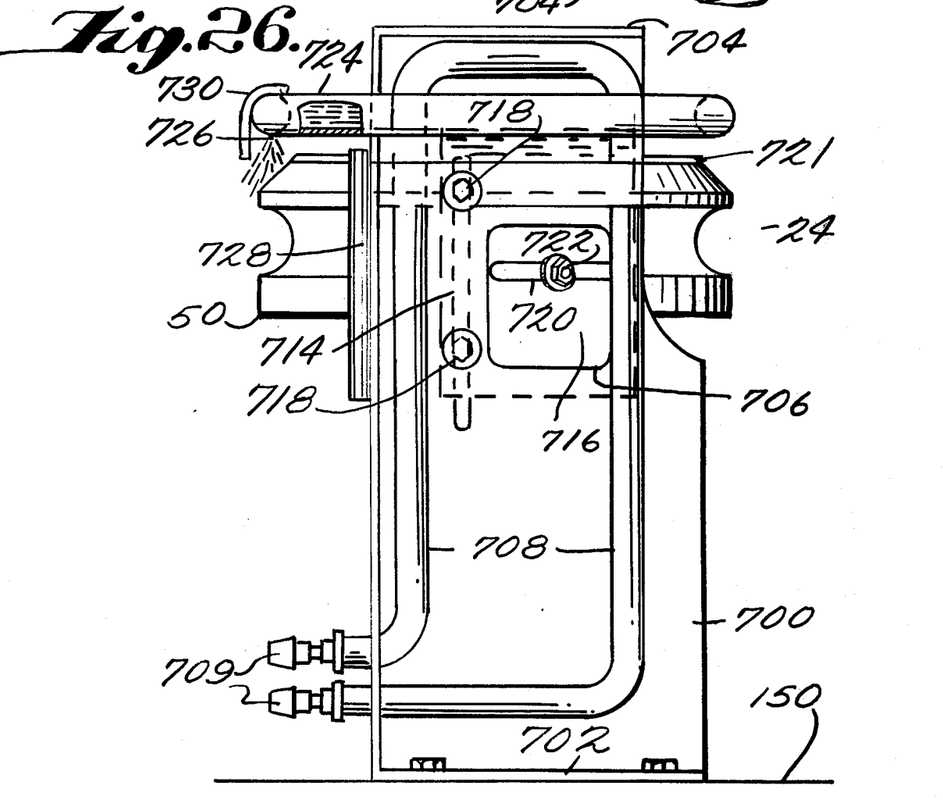
FIG. 26 is a front elevational view of the system for cooling and shielding the pressure rolls employed in the apparatus.

The impeder stabilizing device 22 (FIGS. 1B, 4 and 24) is provided for the purpose of maintaining the impeder core 300 in alignment with the axis of tube 24. This is accomplished by rigidly fixing the support beam 500 to the frame 150 of the apparatus and attaching the upstream fin 20 and downstream fin 38 to the respective ends of the beam 500. Each fin is a sheet of an insulating material, e.g., Teflon, which will be thin enough to protrude through the slit 26 in tube 24, as shown in FIG. 24, where fin 20 is illustrated. The lower ends of the fins are slit upwardly and alternate segments or fingers 502, 504 and 506 thus provided (FIG. 24). The fingers are preformed to surround and grip the impeder tube 306 around more than one half but less than all of its circumference. The fit between tube 306 and the fins 20 and 38 is a friction fit permitting sliding of the tube 306 up and downstream under control of the impeder control device 14. Also, the fingers of the fins do not prevent rotation of tube 306, but do resist it due to the friction between the fingers and the tube.

Pressure Roll Shielding and Cooling

During operation of the apparatus undue heating of the pressure rolls 50 will usually occur unless shielding and cooling devices are provided as illustrated in FIGS. 15, 16, 25 and 26. Immediately upstream of the pressure rolls 50, that is, between the rolls and the modifier 46, each roll 50 is provided with a shield plate 700 which is fixed at its bottom flange 702 to the frame 150 of the apparatus. The shield plate 700 extends upwardly to its top 704, and is a continuous panel except for a rectangular opening 706. Tubing 708 is fixed to the upstream side of shield plate 704 and adapted for connection to a coolant source at fittings 709, so that heat may be extracted from the shield structure. A component of the shielding structure is a sub-panel 710 curved to conform to the edge of roll 50. Sub-panel 710 also has a top portion 712 overlying a portion of the roll 50. A slot 714 is provided in the shield plate 700 for use in mounting an intermediate panel 716 to plate 700 by bolts 718. Panel 716 in turn has a slot 720 for receiving a bolt 722 employed to fix sub-panel 710 to intermediate panel 716. Slot 714 permits vertical adjustment of panel 710, and slot 720 permits rotary adjustment of panel 710. In practice the panel 710 will be positioned as close to tube 24 as possible. Further shielding of rolls 50 is provided by plates 721, preferably copper, mounted on the tops of rolls 50. Plates 721 also will conduct heat away from the rolls.

A tube 724 with a series of apertures 726 along its bottom is supported over each roll 50 so that coolant supplied to the tube may cascade down over the outer surfaces of the roll. It is important to prevent coolant from entering the slit 26 in tube 24, therefore, no apertures are provided in the sector 727 of the tube (FIG. 25), to prevent application of coolant between a wiper 728 and the weld point on pressure rolls centerline 52. Wiper 728 is of a flexible material, e.g., Teflon, and is contoured to fit against and wipe the entire outer surface of roll 50 from top to bottom. Tube 724 may be supported from frame 150 of the apparatus in any convenient manner, as by brackets 730 illustrated in FIGS. 16, 25 and 26, with hose connections 732 for supply of coolant to the tubes 724.

Electrical System

The supply of alternating electric current to the induction coil 42 is conventional except for the frequency proposed for use, i.e., between 30,000 and 90,000 Hz, preferably at or about 50,000 Hz for manufacturing tubing having an outside diameter of one inch. The preferred electrical supply (not shown) is a 3-phase, 60 Hz induction motor driving a single phase generator designed to produce an output current having a frequency of 9,600 Hz. The latter is applied to a so-called multiplier circuit having capacitors in parallel with the induction coil 42. The amount of capacitance may be selected to achieve resonance preferably near the 5th harmonic of the generator output frequency. However, to date, 50,000 Hz has been preferred for operation.

Operation

In the operation of the apparatus the modifier 46 appears to act upon or modify the magnetic field created by the coil 42 so that a surprisingly improved welding operation is achieved, compared to operation without the modifier in previously known equipment. By using the modifier stainless steel tubing of high quality leak-free type may be welded at velocities significantly greater than velocities obtained in previously known equipment. Use of the impeder 300 in conjunction with the modifier further enhances the velocity at which stainless steel may be welded.

At start-up of the welding operation the impeder should be retracted to its upstream position to avoid undue heating of a slow-moving tube in the vicinity of the coil, modifier and impeder.

Examples of Operation

Apparatus constructed substantially in accordance with the foregoing description in the vicinity of the coil, modifier, pressure rolls and impeder has been operated to provide sound welds in tubing made of a variety of materials, at rates of welding which are economically advantageous over the use of previously known induction welding equipment. Examples will now be given, in each of which certain features have been standard (all dimensions are in millimeters (mm) or meters (m)):

1. The tubing was of 25.4 mm outside diameter (OD).
2. The width of the flat stock was 80.52 mm.
3. The induction coil was five turns of 45 mm internal diameter (ID) and 50 mm long. The modifier, the pressure rolls and the shielding between the modifier and the pressure rolls had dimensions to scale in FIG. 5, taking the tube at said 25.4 mm OD as the reference dimension.
4. The downstream end of the induction coil was 101.60 mm from the pressure rolls centerline (the distance A in FIG. 5).
5. The frequency of the current in the induction coil circuit was 50,000 cycles per second (50 kHz).

Certain variations in the apparatus were employed with different tube materials, and these are set forth in the following table. The headings of the columns of the table have meanings as follows:

1. Tube. The entries in this column are the generic names or industry standard designations.
2. Modifier Distance. The distance from the pressure rolls centerline to the downstream end of the modifier (the point 132 in FIG. 9) (the distance B in FIG. 5).

3. Impeder Distance. The distance from the pressure rolls centerline to the downstream end 302 of the impeder (in its operational position) (the distance C in FIG. 5).
4. Thickness. The thickness in inches of the flat stock from which the tube was made.
5. Power. The kilowatts of electrical power delivered from the motor-generator set. The loss in the multiplier circuit was thirty percent.

TABLE

| Tube Material/ Thickness | Distance A (millimeters) | Distance B (millimeters) | Frequency (kHz) | Power (KW) | Velocity (Meters/ Min.) |
|---|---|---|---|---|---|
| #1010 Mild Steel/1.2 mm | | Mod. not Used | 50 | 165 KW | 61.0 |
| #304 Stainless Steel/1.2 mm | 25 mm | 44 mm | 50 | 115 KW | 43.0 |
| #409 Stainless Steel/1.2 mm | 25 mm | 44 mm | 50 | 180 KW | 50.0 |
| Copper/ 2.0 mm | 25 mm | 44 mm | 50 | 100 KW | 33.0 |
| Brass-Al Alloy (76-22-2)/ 1.0 mm | 25 mm | 44 mm | 50 | 75 KW | 79. |
| Aluminum #3003/1.2 mm | 20 mm | Mod. not Used | 50 | 65 KW | 67.0 |

When the modifier was not used, a Teflon cover of like shape was used to conduct and confine the argon in the manner otherwise provided by the modifier.

Materials

In the preferred form of the apparatus, which was used in the running of the foregoing examples, the following materials were used in components in the welding section where the magnetic or conductive characteristic might have an effect upon the induction welding function:

a. The Modifier (including tubes 118–124 and 146–148) was made entirely of copper, except for the Teflon tip 130 of the argon supply tube 118.
b. The pressure rolls were made of a 12% high carbon chromium steel identified as D2 by the American Institute of Iron and Steel.
c. All of the shield components in the 700 series of reference characters were made of copper, as were the plates 721 on the rolls 50.
d. The induction coil 42 was made of copper.
e. The shield 44 between the coil 42 and the modifier 46 was made of copper, as was the shield 40 immediately upstream of the coil 42.
f. The coolant flowed through the induction coil 42 was water.
g. The coolant flowed through the tube 24, as well as that flowed onto the modifier through tubes 122 and 124, that cascaded over the pressure rolls 50 from the tubes 724, and that through the impeder tube 317 and tube 24 was water with oil dissolved therein, specifically a 20:1 water-to-oil mix using Sun Oil Co. Emulsion 51. The latter is a type of oil commonly used in cooling tool bits in lathes and other metal working machine tools.
h. The impeder laminations were 0.05 mm thick steel of relative permeability 40,000 at 3,000 Hz.

Scope

The foregoing specific embodiment of the apparatus has been presented only for purposes of illustration, and the scope of the appended claims is not limited thereto, inasmuch as variations of the apparatus embodying the inventions will occur to those of ordinary or greater skill in the art upon gaining knowledge of the apparatus as above described.

What is claimed is:

1. In a tube induction welding apparatus,
   (a) an induction coil surrounding the path of the tube,
   (b) means downstream of the coil for forcing the edges of the tube to be welded into contact at a given point
   (c) and a modifier between the coil and the forcing means,
   (d) the modifier being an electrically conductive member having at least a portion thereof positioned to overlie the path followed by the slit which exists in the tube upstream of the contact point,
   (e) the modifier having a dimension lengthwise of the tube, which dimension lies within the space between the downstream end of the coil and the aforesaid contact point,
   (f) the modifier including skirt portions extending laterally from said modifier portion overlying the path of the slit in the tube and curved to substantially conform to the curvature of the outer surface of the tube when the latter is in place in the apparatus
   (g) the skirt portions of the modifier at the upstream end thereof extending to encompass at least one half of but less than all of the circumference of the tube.

2. Apparatus as in claim 1 in which the skirt portions decrease in circumferential extent at points downstream of the upstream end of the modifier.

3. Apparatus as in claim 2 in which the skirt portions of the modifier are configured to conform to the curvature of the rolls in the downstream region of the modifier.

4. Apparatus as in any one of claims 1 through 3 in which the modifier is made of non-magnetic material.

5. Apparatus as in any one of claims 1 through 3 in which the modifier is made of copper.

6. Apparatus as in any one of claims 1 through 3 and including means to energize the induction coil at a frequency between 30,000 Hz and 90,000 Hz.

7. In a tube induction welding apparatus,
   (a) an induction coil surrounding the path of the tube,
   (b) a pair of pressure rolls downstream of the coil for forcing the edges of the tube into contact,
   (c) and means to cool the rolls by flowing coolant thereover,
   (d) the cooling means including a perforated tube above the upper periphery of each roll for cascading coolant down over the exterior surface of each rool except in the sector of the roll whereat contact and welding of the tube edges occurs, said cooling means further including a plate for conducting heat away from said rolls, and a shield plate surrounding at least a portion of said pressure rolls, said shield plate thermodynamically coupled to a coolant source.

8. An apparatus as in claim 7 and further including a wiping means acting on the periphery of each roll ahead of the point between the rolls whereat contact of the tube edges occurs to wipe the roll free of coolant, the position of the wiping means being inside the sector in which no perforations exist.

* * * * *